(12) United States Patent
Koelle et al.

(10) Patent No.: US 9,214,872 B2
(45) Date of Patent: Dec. 15, 2015

(54) METHOD FOR ACTUATING THE SWITCHING TRANSISTORS OF A RECTIFIER

(75) Inventors: Gerhard Koelle, Wiernsheim (DE); Benno Koeppl, Markt Indersdorf (DE); Michael Scheffer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 248 days.

(21) Appl. No.: 13/976,247

(22) PCT Filed: Dec. 20, 2011

(86) PCT No.: PCT/EP2011/073317
§ 371 (c)(1),
(2), (4) Date: Oct. 24, 2013

(87) PCT Pub. No.: WO2012/089551
PCT Pub. Date: Jul. 5, 2012

(65) Prior Publication Data
US 2014/0036562 A1 Feb. 6, 2014

(30) Foreign Application Priority Data
Dec. 27, 2010 (DE) .......................... 10 2010 064 168

(51) Int. Cl.
*H02M 7/219* (2006.01)
*H02M 7/217* (2006.01)

(52) U.S. Cl.
CPC .............. *H02M 7/219* (2013.01); *H02M 7/217* (2013.01); *H02M 7/2173* (2013.01); *H02M 2007/2195* (2013.01); *Y02B 70/1408* (2013.01)

(58) Field of Classification Search
CPC .... H02M 7/2173; H02M 7/217; H02M 7/219
USPC .............. 363/44, 52, 76, 81, 84, 87, 127, 129
See application file for complete search history.

(56) References Cited

U.S. PATENT DOCUMENTS

2011/0235381 A1* 9/2011 Wolf et al. .................... 363/127
2012/0081061 A1* 4/2012 Zargari et al. ................. 318/503

FOREIGN PATENT DOCUMENTS

| CN | 101796712 A | 8/2010 |
|----|-------------|--------|
| EP | 2197096 A1 | 6/2010 |
| TW | 200924368 A | 6/2009 |
| WO | 2010034793 A1 | 4/2010 |

OTHER PUBLICATIONS

International Search Report of PCT/EP2011/073317, dated Apr. 5, 2013, 11 pp.

* cited by examiner

*Primary Examiner* — Fred E Finch, III
*Assistant Examiner* — Rafael O De Leon Domenech
(74) *Attorney, Agent, or Firm* — Shumaker & Sieffert, P.A.

(57) ABSTRACT

The invention relates to a method for actuating the switching transistors of a rectifier which is provided for converting the phase voltages that are provided by a vehicle generator into a direct current voltage. Each switching transistor comprises a parasitic diode. An activation signal for initiating the conducting phase and a de-activation signal for ending the conducting phase are supplied to each control terminal of the switching transistors. A timer is started simultaneously with the provision of an activation signal and the de-activation signal is provided once a predetermined time period has passed.

24 Claims, 2 Drawing Sheets

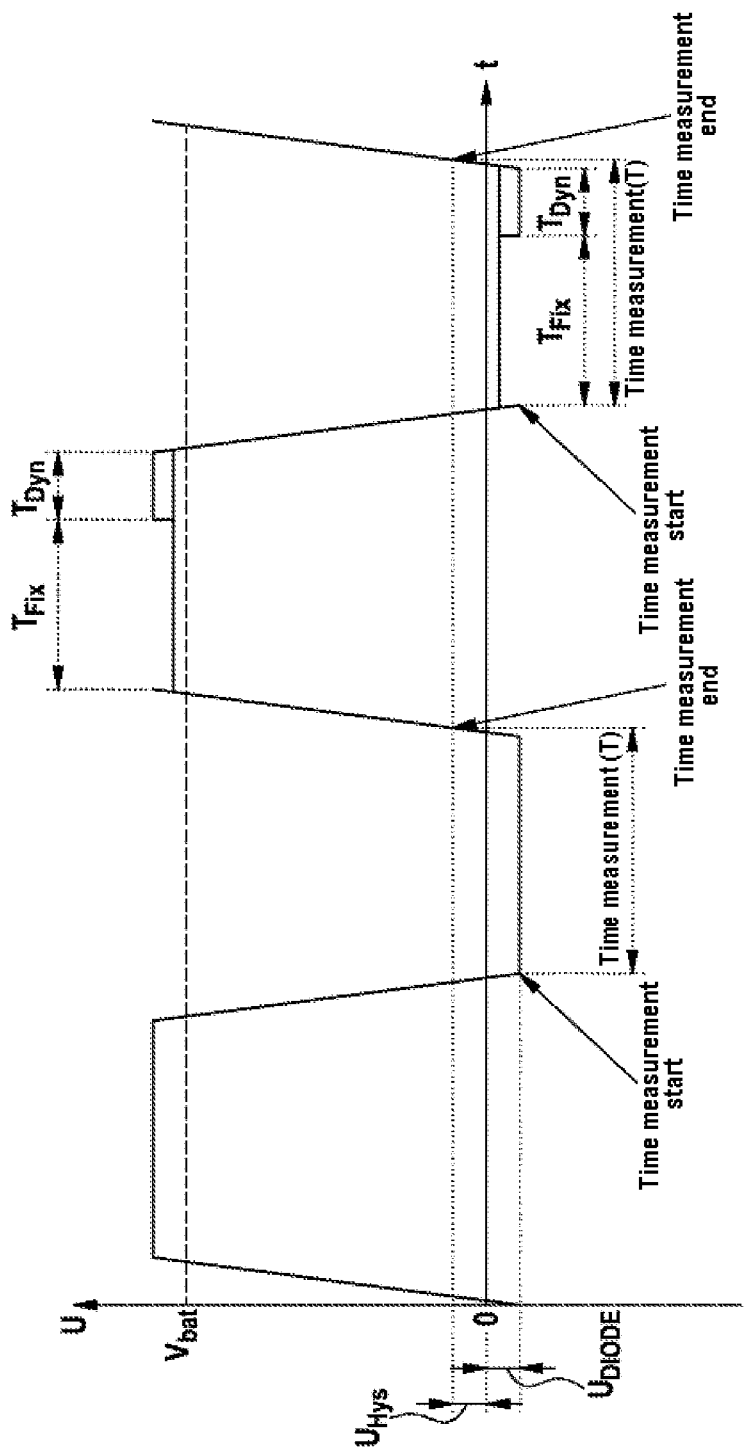

METHOD FOR ACTUATING THE SWITCHING TRANSISTORS OF A RECTIFIER

Figure 1:
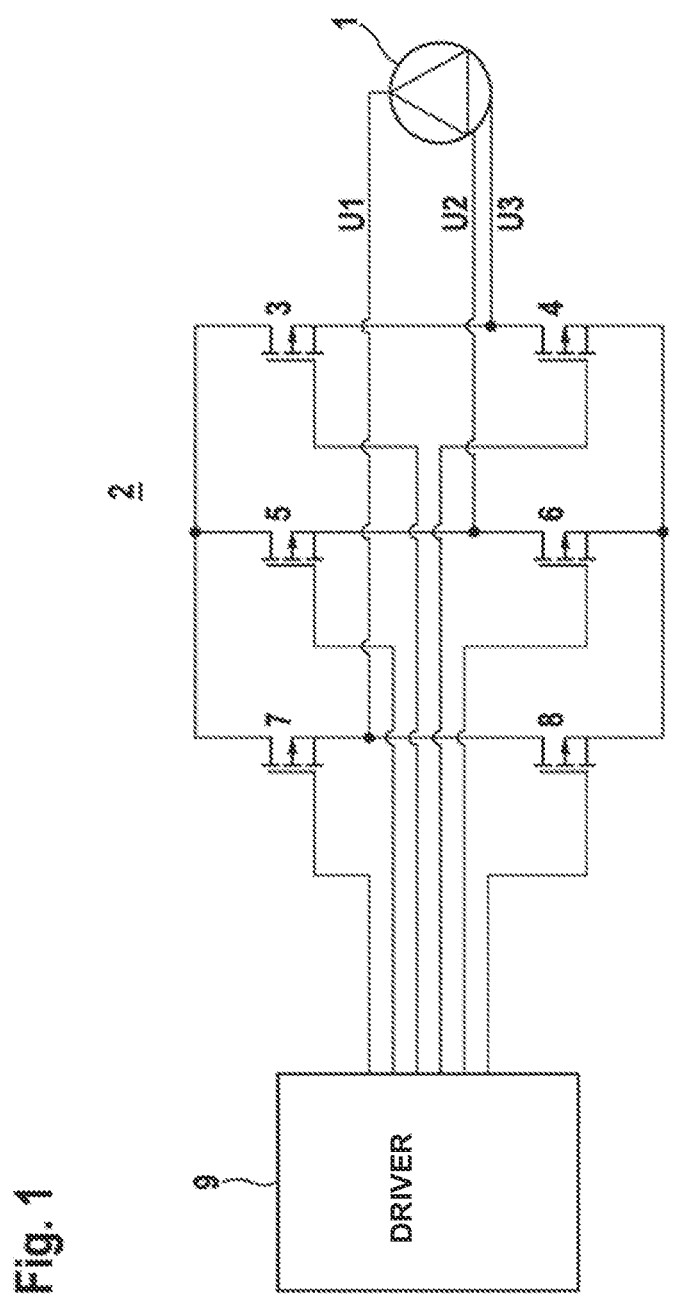

The invention relates to a method for actuating the switching transistors in a rectifier.

PRIOR ART

In recent years, power consumption in motor vehicles has risen steadily. In order to keep this rise in power consumption as low as possible, attempts are being made to increase the efficiency of the generator in the respective motor vehicle.

Motor vehicle generators in current use are usually designed as three-phase generators. The output voltage from such a generator is a three-phase AC voltage that is supplied to a rectifier that converts the three-phase AC voltage into a DC voltage and provides this DC voltage for the onboard power supply system of the respective motor vehicle.

Such a rectifier has three paths arranged parallel with one another that are each associated with one phase of the generator and each have a series circuit comprising two diodes. One of these diodes is a high-side diode and the other diode is a low-side diode.

Furthermore, it is already known practice to replace the diodes in a rectifier with switching transistors for the purpose of decreasing the power loss. This preferably involves the use of MOSFETs. In this case, however, the problem arises that the MOSFETs each need to be switched on at a suitable time and switched off at a suitable further time. If this switching of the MOSFETs does not take place at the suitable time, power loss occurs in undesirable fashion.

One way of actuating the MOSFETs is to measure the voltage drop across the respective MOSFET and then to actuate the MOSFET when this voltage drop is negative. This principle does not pose any problem when the conductive phase of the MOSFET is initiated, since the voltage drop across the parasitic diode of the respective MOSFET is of sufficient magnitude and accordingly is easy to evaluate. The MOSFET can be actuated even before the parasitic diode in the MOSFET becomes conductive. In the conductive phase of the MOSFET, the voltage drop across the MOSFET is very small, on the other hand, and is just in the region of a few mV (millivolts). If disturbances occur in the presence of such small voltage drops, this can result in the respective MOSFET being switched off in unwanted and uncontrolled fashion. This produces a comparatively high power loss in the MOSFET and the MOSFET becomes undesirably hot.

DISCLOSURE OF THE INVENTION

By contrast, a method for actuating the switching transistors in a rectifier having the features specified in claim 1 has the advantage that disturbances that occur during the switched-on time of the switching transistors cannot result in the respective switching transistor being switched off in undesirable fashion. This reduces the power loss in the rectifier. This advantage is achieved essentially by virtue of the switch-off signal being provided after a prescribed period of time after the switch-on signal is present has elapsed, this prescribed period of time being determined afresh in every actuation period of the switching transistor. The effect advantageously achieved by this determination of the actual possible period of time in every actuation period is that it is possible to react to rotation speed fluctuations very quickly. If the rotation speed becomes higher and hence the measured period of time becomes shorter, the next prescribed period of time is reduced. If an excessive rotation speed gradient means that the switched-on time of the switching transistor is longer than the measured time by the variable time interval, i.e. a positive current flows through the switching transistor, then the variable time interval is reset to zero and the fixed time interval is reduced in line with the prescribed period of time.

Further advantages of the invention will emerge from the explanation thereof below with reference to the drawing, in which FIG. 1 shows an outline of an apparatus for actuating the switching transistors in a rectifier, and FIG. 2 shows a graph to explain a method for actuating the switching transistors in a rectifier.

FIG. 1 shows an outline of an apparatus for actuating the switching transistors in a rectifier. This outline shows a motor vehicle generator 1 that provides phase voltages U1, U2 and U3 at its outputs. These phase voltages, which are each AC voltages, are converted by means of a rectifier 2 into a DC voltage that is made available to the onboard power supply system of the motor vehicle.

The rectifier 2 has a total of six switching transistors 3, 4, 5, 6, 7 and 8, which are each a MOSFET in the exemplary embodiment shown. These switching transistors are actuated by means of a driver 9, which provides the control connection of the respective switching transistor with a switch-on signal, for initiating the conductive phase, and a switch-off signal, for terminating the conductive phase, in every actuation period of a respective suitable time.

Each of the MOSFETs 3, 4, 5, 6, 7 and 8 contains a parasitic diode, which is not shown.

According to the present invention, the MOSFETs are actuated under timing control. In this case, the trigger used for starting a time measurement is the voltage drop across the parasitic diode of the respective MOSFET. This MOSFET is switched off after a prescribed time, which is ascertained using a timer and is optimized using a regulatory algorithm such that at the switch-off time it still possible to measure a sufficiently large voltage across the parasitic diode, preferably a voltage for which the voltage value is greater than or equal to 400 mV.

The effect advantageously achieved by this is that, in contrast to the prior art, in which the switch-off signal is ascertained in the presence of very small voltage drops across the switching transistor that is still on, said voltage drops being smaller than 50 mV, the evaluation of such small voltage drops for the purpose of ascertaining the switch-off time is avoided. Consequently, when the method according to the invention is used, disturbances that occur during the switched-on time of the respective MOSFET cannot result in the respective MOSFET being switched off in uncontrolled and undesirable fashion.

Advantageously, the present invention involves the forward voltage of the parasitic diode being evaluated as the trigger for starting the time measurement. At the same time as the time measurement starts, the driver 9 provides the switch-on signal for initiating the conductive phase of the respective MOSFET. The switch-off signal for terminating the conductive phase of the MOSFET is provided after a prescribed period of time has elapsed. This period of time is split into a fixed time interval and an alterable time interval in the steady-state rotation speed range. The alterable time interval is optimized to a minimum from actuation interval to actuation interval by using a regulatory algorithm. After the respective MOSFET has been switched off, it is still possible to measure a voltage drop of sufficient magnitude across the parasitic diode of the MOSFET without the parasitic diode of the MOSFET being conductive.

FIG. 2 shows a graph to explain a method for actuating the switching transistors in a rectifier. This graph plots the time t along the abscissa and one of the phase voltages U along the ordinate. This graph reveals that the timer is started when the phase voltage is equal to the forward voltage of the parasitic diode of the respective MOSFET ($Up_{D_i}o_{d}e$) at ground potential. At the next zero crossing and while awaiting a hysteresis ($U_{Hy}$s), the timer is read. This measured time T is split into two time intervals for the next actuation period, namely into a fixed time interval $T_{Fix}$ and an alterable time interval $T_{Dyn}$.

The next actuation periods involve respective measurement of the time in which the voltage drop across the parasitic diode of the MOSFET is greater than 400 mV, and the alterable time interval $T_{Dyn}$ is adjusted toward the positive such that the alterable time interval falls to a minimum. Conversely, the variable time interval is adjusted negatively if immediately after the MOSFET is switched off the voltage measured across the parasitic diode of the MOSFET has a value that is less than 50 mV.

The measurement processes described above are carried out for a low-side MOSFET, for example the low-side MOSFET 4. For actuating the associated high-side MOSFET, for example the high-side MOSFET 3, it is possible to use the times ascertained for the low-side MOSFET, since the duration of the conductive phase of the high-side MOSFET is equal to the duration of the conductive phase of the respective associated low-side MOSFET.

An advantage of the approach described above is that the measurement of the time in every actuation period means that it is possible to react to any rotation speed fluctuations very quickly. When the rotation speed is rising and hence the measured time is diminishing, the alterable time interval is reduced. If an excessive rotation speed gradient means that the switched-on time is longer than the measured time by the alterable time interval, i.e. a positive current flows through the MOSFET, then the alterable time interval is reset to zero and the fixed time interval is reduced in line with the switched-on time.

Further advantages of the invention are that it is only necessary to react to voltages that are greater than 400 mV. Maximization of the conductive phase of the MOSFET reduces the power loss in the rectifier. Furthermore, use of the method according to the present invention allows the requisite MOSFET sizes to be reduced, and it becomes possible to use new MOSFET technologies. In addition, the occurrence of reverse currents is avoided.

The voltage values indicated above have been indicated as part of the explanation of an exemplary embodiment.

Alternatively, it is also possible to use other voltage values, particularly voltage values that are optimized downward.

The present invention involves regulation to a minimum residual time after the switch-on phase, this residual time being able to be measured using the positive voltage of the nonconductive parasitic diode of the respective switching transistor. The aim of this regulation is to minimize this time, because in this time it would be possible for a switching transistor that is switched on still to output power to the power supply system.

The invention claimed is:

1. A method for actuating switching transistors in a rectifier that is provided for converting phase voltages provided by a motor vehicle generator into a DC voltage, wherein the switching transistors each contain a parasitic diode and wherein control connections of the switching transistors are each provided with a switch-on signal for initiating a conductive phase and a switch-off signal for terminating the conductive phase, wherein at the same time as the switch-on signal is provided; a timer is started and the switch-off signal is provided after a prescribed period of time has elapsed, wherein the prescribed period of time is split into a fixed time interval and an alterable time interval, and is determined anew for each conductive phase.

2. The method as claimed in claim 1, characterized in that the switch-on signal is provided in response to a voltage drop across each parasitic diode of the switching transistors.

3. The method as claimed in claim 1, characterized in that the prescribed period of time by adjusting the alterable time interval is regulated such that the switch-off signal is provided at a time at which the voltage drop across each parasitic diode of the switching transistors is greater than a prescribed first voltage value.

4. The method as claimed in claim 3, characterized in that the prescribed first voltage value is 50 mV.

5. The method as claimed in claim 1, characterized in that the alterable time interval is optimized to a minimum from a first actuation period to the subsequent second actuation period.

6. The method as claimed in claim 5, characterized in that the first actuation period involves the use of a timer to ascertain the prescribed period of time, wherein the prescribed period of time is split into fixed and alterable time intervals for the subsequent second actuation period, wherein subsequent further actuation periods involve measurement of the time in which the voltage drop across the parasitic diode is greater than a prescribed second voltage value, and wherein the alterable time interval is regulated such that the alterable time interval is minimized.

7. The method as claimed in claim 6, characterized in that the prescribed second voltage value is 400 mV.

8. The method as claimed in claim 6, characterized in that if, following a provision of a switch-off signal, the voltage drop across each parasitic diode of the switching transistors is greater than the prescribed second voltage value then the alterable time interval is reduced, or in that if, following the provision of the switch-off signal, the voltage drop across each parasitic diode of the switching transistors is less than a prescribed first voltage value then the alterable time interval is increased.

9. The method as claimed in claim 1, characterized in that the switching transistors are MOSFETs.

10. The method as claimed in claim 1, characterized in that the motor vehicle generator is a three-phase generator or a polyphase generator, wherein each phase of the motor vehicle generator has an associated high-side switching transistor and low-side switching transistor of the rectifier, wherein the prescribed period of time is measured for the low-side switching transistor and the actuation time of the relevant high-side switching transistors is determined by using the period of time measured for the low-side switching transistor.

11. The method as claimed in claim 10, characterized in that the high-side switching transistors and the low-side switching transistors are formed from a parallel circuit comprising a plurality of switching transistors.

12. The method as claimed in claim 1, wherein the alterable time interval is less than the fixed time interval.

13. An apparatus for converting phase voltages provided by a motor vehicle generator into a DC voltage, the apparatus comprising:
   a driver that includes control connections, wherein the driver is configured to provide a switch-on signal over the control connections for initiating a conductive phase of the motor vehicle generator and a switch-off signal over the control connections for terminating the conductive phase of the motor vehicle generator;

a rectifier coupled to the driver via the control connections, the rectifier comprising switching transistors, wherein each of the switching transistors contains a parasitic diode, wherein each of the switching transistors is configured to, switch-on in response to the switch-on signal at the control connections and is further configured to switch-off in response to the switch-off signal at the control connections; and a timer coupled to both the driver and the rectifier at the control connections, wherein the timer is configured to start in response to the switch-on signal at the control connections, and wherein the driver is further configured to provide the switch-off signal after a prescribed period of time has elapsed since the start of the timer, wherein the prescribed period of time comprises a fixed time interval and an alterable time interval, and is determined anew for each conductive phase.

14. The apparatus of claim 13, wherein the driver is further configured to provide the switch-on signal in response to a voltage drop across each parasitic diode of the switching transistors.

15. The apparatus of claim 13, wherein the prescribed period of time corresponds to a time at which a voltage drop across each parasitic diode of the switching transistors is greater than a prescribed first voltage value.

16. The apparatus of claim 15, wherein the prescribed first voltage value is 50 mV.

17. The apparatus of claim 13, wherein the alterable time interval corresponds to an amount of time between a first actuation period to a subsequent second actuation period.

18. The apparatus of claim 17, wherein the driver is further configured to determine the prescribed period of time using the timer during the first actuation period, wherein the driver is further configured to determine that the prescribed period of time during the subsequent second actuation period includes fixed and alterable time intervals, wherein the driver is further configured to determine the prescribed period of time for subsequent further actuation periods based on a measurement of time from when the voltage drop across each parasitic diode is greater than a prescribed second voltage value, and wherein the alterable time interval corresponds to a minimum alterable time interval.

19. The apparatus of claim 18, wherein the prescribed second voltage value is 400 mV.

20. The apparatus of claim 18, wherein the driver is further configured to reduce the alterable time interval if, following a provision of a switch-off signal, the voltage drop across each parasitic diode of the switching transistors is greater than the prescribed second voltage value, and wherein the driver is further configured to increase the alterable time interval if, following the provision of the switch-off signal, the voltage drop across each parasitic diode of the switching transistors is less than a prescribed first voltage value.

21. The apparatus of claim 20, wherein the alterable time interval is less than the fixed time interval.

22. The apparatus of claim 13, wherein each of the switching transistors comprises a MOSFET.

23. The apparatus of claim 13, wherein the motor vehicle generator comprises a three-phase generator or a polyphase generator, wherein each phase of the motor vehicle generator has an associated high-side switching transistor of the rectifier and an associated low-side switching transistor of the rectifier, wherein the prescribed period of time is associated with the low-side switching transistor and the actuation time of the relevant high-side switching transistors is based on the period of time associated with the low-side switching transistor.

24. The apparatus of claim 23, further comprising a parallel circuit comprising a plurality of switching transistors including the high-side switching transistors and the low-side switching transistors.

* * * * *